(12) United States Patent
Walker et al.

(10) Patent No.: US 6,870,520 B2
(45) Date of Patent: Mar. 22, 2005

(54) IMMERSIVE DISPLAY SYSTEM

(76) Inventors: Richard C. Walker, 2060 Oberlin St., Palo Alto, CA (US) 94306-1315; Pierre H. Mertz, 849 San Juan Dr., Sunnyvale, CA (US) 94085; Barclay J. Tullis, 1795 Guinda St., Palo Alto, CA (US) 94303

( * ) Notice: Subject to any disclaimer, the term of this patent is extended or adjusted under 35 U.S.C. 154(b) by 29 days.

(21) Appl. No.: 10/341,624

(22) Filed: Jan. 14, 2003

(65) Prior Publication Data

US 2003/0103016 A1 Jun. 5, 2003

Related U.S. Application Data

(63) Continuation of application No. 09/563,182, filed on May 5, 2000, now Pat. No. 6,552,698.

(51) Int. Cl.$^7$ ................................................. G09G 5/00
(52) U.S. Cl. ............................................. 345/7; 345/8
(58) Field of Search ................. 345/7, 8, 9; 349/11; 359/630; 348/51, 53, 54

(56) References Cited

U.S. PATENT DOCUMENTS

| | | | |
|---|---|---|---|
| 4,446,480 A | | 5/1984 | Breglia et al. |
| 4,713,651 A | * | 12/1987 | Morag ..................... 340/407.1 |
| 4,807,202 A | * | 2/1989 | Cherri et al. ............... 367/129 |
| 4,984,179 A | * | 1/1991 | Waldern ..................... 345/8 |
| 5,085,507 A | * | 2/1992 | Williams et al. ......... 356/139.03 |
| 5,424,556 A | | 6/1995 | Symosek et al. |
| 5,684,498 A | | 11/1997 | Welch et al. |
| 5,812,257 A | | 9/1998 | Teitel et al. |
| 5,850,201 A | | 12/1998 | Lasko-Harvill et al. |
| 5,869,857 A | * | 2/1999 | Chen ......................... 257/292 |
| 6,127,990 A | * | 10/2000 | Zwern ......................... 345/8 |
| 6,522,312 B2 | * | 2/2003 | Ohshima et al. ............... 345/8 |
| 6,552,698 B1 | * | 4/2003 | Walker et al. .................. 345/7 |

FOREIGN PATENT DOCUMENTS

WO  WO 96/07947  3/1998

OTHER PUBLICATIONS

M. D. Stephenson, "A Helmet–Mounted Sight Using C.C.D. Technology", The Radio End Electronic Engineering, vol. 49, No. 10, Oct. 1979, PP. 511–513.

L. Russo, "Helmet Mounted Visually Coupled System", Proceedings of the SID, vol. 9, No. 4, 1978, pp. 181–185.

* cited by examiner

Primary Examiner—Xiao Wu (57) ABSTRACT

An immersive display system which provides for an optical correlator for imaging a surface and generating data representative of the position or movement of the optical correlator and any object physically associated with the optical correlator. Imagery is generated and displayed on a display device in accordance with the data generated by the optical correlator.

14 Claims, 5 Drawing Sheets

IMMERSIVE DISPLAY SYSTEM

CROSS REFERENCE TO RELATED APPLICATIONS

This application is a continuation application, which is based on and claims priority to U.S. Utility patent application Ser. No. 09/563,182, filed on May 5, 2000, now U.S. Pat. No. 6,552,698 which is incorporated by reference herein.

FIELD OF THE INVENTION

The present invention relates to an immersive display system. More particularly, the present invention relates to an immersive display system that incorporates an optical correlator for imaging surrounding features within a environment and determining the relative position of a user's head within the environment as to display imagery on a visual display relative to the position of the user's head within the display environment.

BACKGROUND OF THE INVENTION

Simulation systems are known which attempt to provide a user with a realistic simulation of being in a predefined environment, such as, for example, on a golf course or in the cockpit of an airplane. This is accomplished by providing the user with appropriate visual cues, or images. For greatest effect images are provided to the user so as to provide for substantially all visually perceptible sensory input to the user. These systems are useful for providing the user with the simulated experience of being in another environment.

Known systems provide for a display device which is typically supported by a user in very close proximity to the user's eyes so as to dominate the visual input received by the user's eyes. In order to provide for a realistic illusion of being in a different environment, known systems have provided for images or scenes shown on the display device to be changed, or modified by a connected image generator in accordance with changes in the position of a user's head.

As an example, a user could experience standing on a golf course ready to tee-off. As the user maintains a forward head position, the user is, for example, presented with an image or scenes of a fairway leading up to a green on the golf course. As the user turns his/her head to the left, the position of the user's head changes with relation to the environment and thus the connected image generator changes images presented to the user on the display so as to give the user the illusion of turning his/her head while standing at the tee. For example, the user might be presented with images of fellow golfers standing to his/her left or right.

In order to provide the user with a realistic visual perception, known systems have used accelerometers to measure the changes in a user's head motion to calculate the position of the user's head. These systems suffer from inaccuracies due to the drift in head location estimates. Although these inaccuracies can be partially compensated for by introducing a high-pass function of the head position estimate to bias any drift toward a steady state "head-upright forward facing" condition. It is useful only if the user's head position makes short deviations from a forward facing heads up condition. Otherwise, in situations such as where a user is non-seated or free-roaming, errors are introduced which cannot be easily compensated for.

SUMMARY OF THE INVENTION

The present invention provides for an immersive display system which incorporates an optical correlator for imaging a surrounding environment to allow for determining the location and angle of a user's head in respect to features and structures within a surrounding environment. There is also provided a display device for displaying imagery relative to the location and angle of a user's head within the environment. A further aspect provides for a navigation engine for calculating the relative position of the user's head within a environment.

The method of the present invention provides for receiving positional signals from an optical correlator and determining a relative position based upon the positional signal. Imagery is then generated and displayed in accordance with the positional signal.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1 illustrates the present invention;

DETAILED DESCRIPTION

Figure 1:
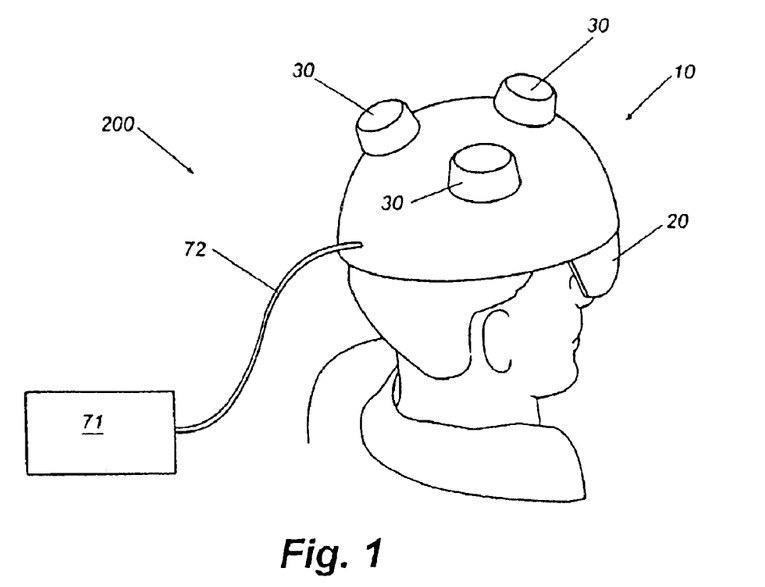

With reference to FIG. 1, the present invention provides for an immersive display system in which a environment 200 is provided. The surface of the structures and features within the environment 200 are imaged by an optical correlator 30 to determine the position and angle of a user's head relative to surrounding structures and features within environment 200.

Environment 200 may be any environment. As an example, the interior of a house could be used to define the environment 200. In this case the ceiling, floor, walls, furniture and other contents and features within the house could be imaged by optical correlator 30 to determine the position and angle of a user's head relative to surrounding structures and features within environment 200. As a further example, environment 200 can be defined by the surrounding features and structures, including buildings, trees, the sky, ground and other features that one might encounter outdoors. In short, environment 200 may be defined by almost any environment in which a user of the present invention may find themself.

The details of carrying out the imaging of the environment 200 via optical correlator 30 are discussed below with regard to a environment defined by an enclosure 100. It will be recognized that the following discussion is fully applicable to the embodiment of the invention shown in FIG. 1.

Figure 2:
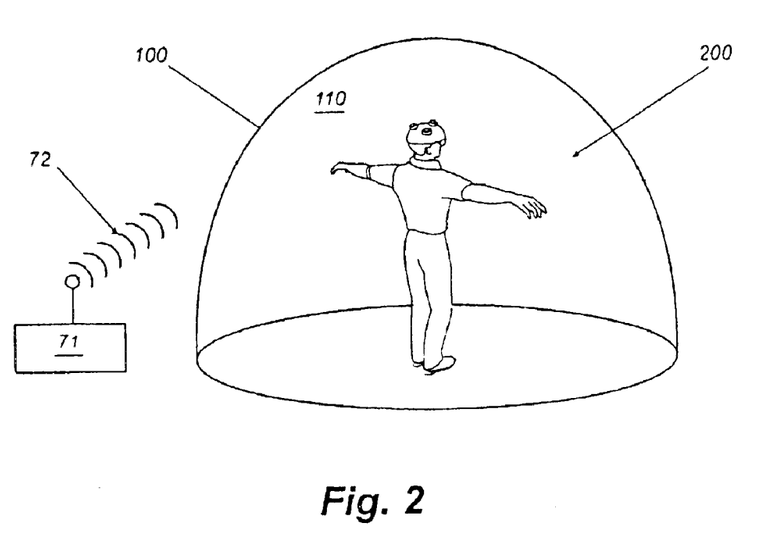
FIG. 2 illustrates the present invention in respect to a environment.

FIG. 2 illustrates another embodiment of the present invention wherein an enclosure defines the boundaries a environment 200. In this embodiment an enclosure 100 is used to define the environment 200. Enclosure 100 has an interior surface 110 area that is preferably patterned, or textured. This pattern or texture is preferably high contrast. Although the enclosure 100 may be of any shape or size, a preferred embodiment is of a hemispheric or globe-like shape.

Figure 3:
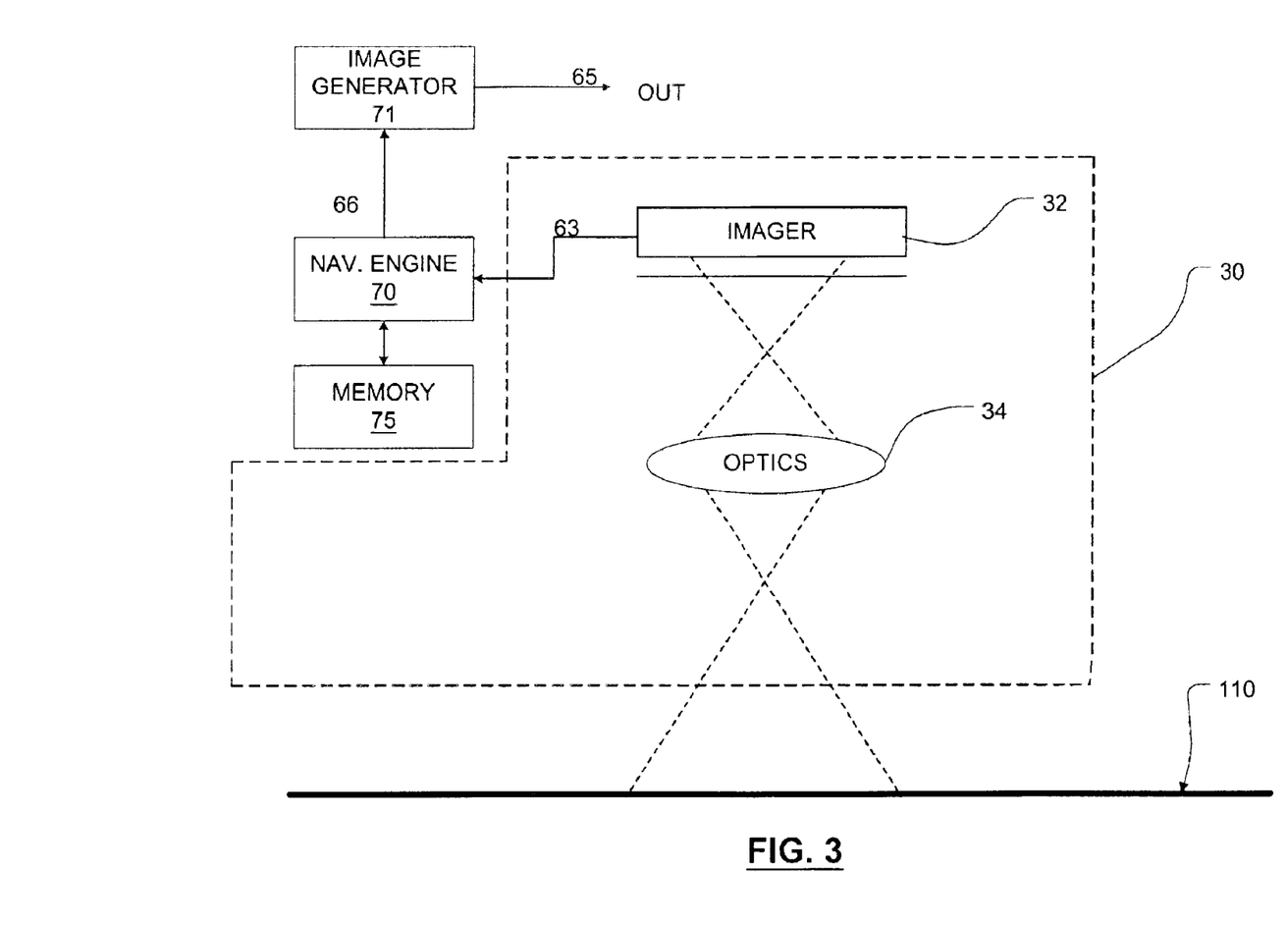
FIG. 3 illustrates an optical correlator.

With reference to FIG. 1, FIG. 2 and FIG. 3, the present invention provides a display unit 10 that incorporates an optical correlator 30 to determine the position and angle of a user's head relative to surrounding structures and features within environment 200. Display unit 10 also includes visual display 20.

Optical correlator 30 incorporates an imager 32 and an optical system 34 for focusing light on to imager 32. Imager 32 is preferably a complementary metal-oxide semiconductor (CMOS) photo imager, however, other imaging devices such as a charge coupled-device (CCD), photo diode array or photo transistor array may also be used.

Light is reflected from interior surface 110 and on to imager 32 via optical system 34. Imager 32 generates an imaging signal 63, or snapshot, at a predetermined rate, representative of that portion of the interior surface 110 of enclosure 100 that is currently being monitored, or imaged by imager 32. This imaging signal 63 is delivered to a navigation engine 70 and may be stored into memory 75.

Navigation engine 70 generates positional signal 66 and outputs it to image generator 71. Image generator 71 subsequently generates an output signal 65 for display on visual display 20, given the relative position and angle of the user's bead relative to the environment 200 as represented by positional signal 66. In a preferred embodiment, display unit 10 is equipped with three (3) optical correlators 30. Each of these optical correlators individually images interior surface 110 and provides a cumulative output to navigation engine 70.

It should be noted that navigation engine 70, and memory 75, can be configured as an integral part of display unit 10. Further, navigation engine 70 could be implemented as, for example, but not limited, a dedicated digital signal processor (DSP); an application specific integrated circuit (ASIC) or a combination of logic gates. Positional signals generated by imager 32 can be transferred to navigation engine 70 via either a cable interface or a wireless transmission system. The wireless transmission system could be, for example, optical or radio frequency. Further, positional signal 66 can be provided to image generator 71 via an interface 72. Interface 72 can be, for example, either a cable interface or a wireless transmission system. Examples of wireless interface systems are an optical transmitter/receiver systems or radio frequency transmitter/receiver.

As for visual display 20, it will be recognized that visual display 20 may be implemented in a variety of display means, including, for example, cathode ray tube, liquid crystal display or holographic display.

Figure 4:
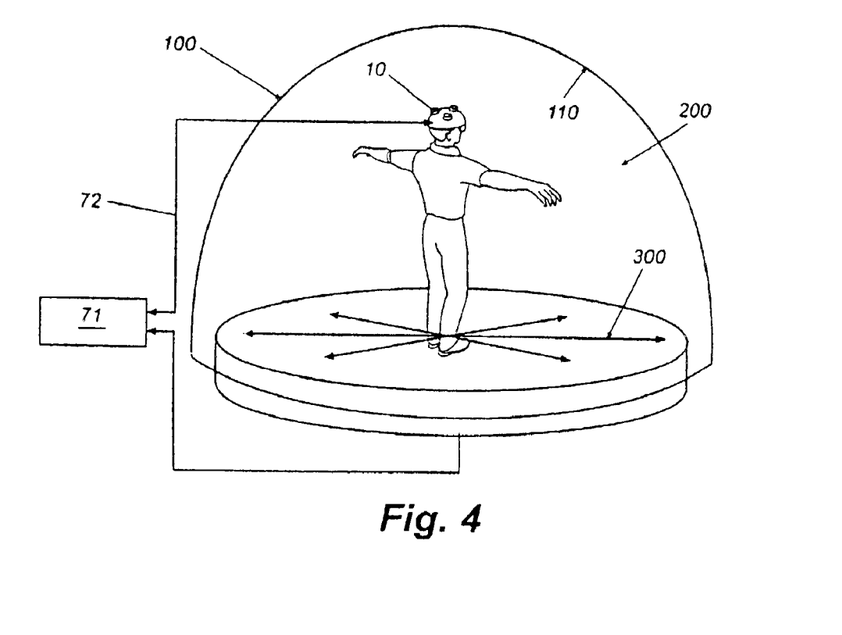
FIG. 4 illustrates an alternate embodiment of the present invention.

In FIG. 4 another aspect of the present invention, there is provided a omni-directional omni-directional treadmill 300 which allows a user to seemingly walk in any direction, however, without actually ever leaving the environment 200. As the user walks, image generator 71 receives an input signal from omni-directional treadmill 300 which is used to determine the imagery to be generated by image generator 71 for display on visual display 20. The input signal from omni-directional treadmill 300 could represent the speed or direction of the omni-directional treadmill 300, where speed and direction of the omni-directional treadmill 300 are influenced by the movement or footsteps of a user on the omni-directional treadmill 300. This input could be used to provide relative speed and directional information related to the user to the image generator 71. In turn, image generator 71 can adjust or change the imagery displayed on visual display 20 in accordance with the input signal from omni-directional 300. For example, if the signal from omni-directional treadmill 300 indicates the speed is increasing image generator 71 could, for example, cause imagery to be displayed on visual display 20 faster so as to give the user a view which is consistent with walking faster or running within the apparent displayed scene shown on visual display 20.

Figure 5:
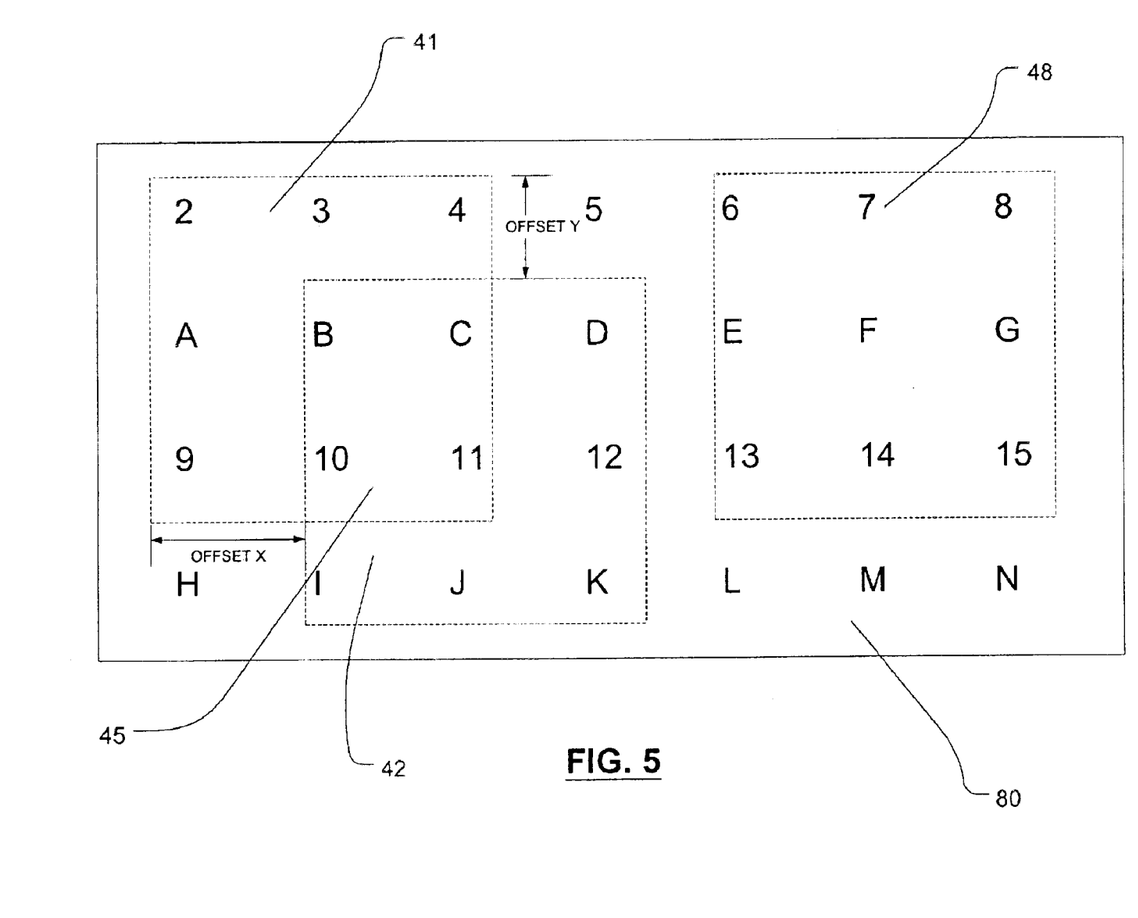
FIG. 5 illustrates an interior surface having a distinct surface characteristic.

FIG. 5 shows an interior surface 110 of enclosure 100, which has a distinct surface characteristic, or pattern. In this example, the pattern is represented by alpha-numeric characters to ease explanation, as the alpha-numeric characters are more easily distinguishable for purposes of discussion. However, such alpha-numeric characters could in fact be used as an effective surface pattern for interior surface 110 as contemplated by the present invention.

With reference to FIG. 5, there is shown a first, or reference snapshot (REF) 41; a second, or comparison snapshot (CMP) 42; and an area of commonality 45. Each snapshot, REF 41 and CMP 42, represents a predetermined area, for example, an area 300 mm ×300 mm.

During the use of display unit 10 in a environment 200, imager 32 obtains a first snapshot (image) of the interior surface 110 of enclosure 100 as a reference snapshot (REF). This reference-snapshot data (REF) is stored into memory 75. After a fixed amount of time, a second snapshot of the interior surface 110 of enclosure 100 is obtained by the imager 32 as comparison (CMP) snapshot 42. Data representing CMP 42 is then compared by navigation engine 70 with data representing REF 41, which is stored in memory 75. More particularly, CMP data is mathematically cross-correlated with REF image data stored in memory 75 so as to determine the offset, in both the X and Y direction, between the first (REF) snapshot 41 and the second (CMP) snapshot 42. Cross correlation calculations may be carried out in accordance with equation 1 as follows:

$$C_{i,j} = \sum_{m=1}^{M} \sum_{n=1}^{N} r_{m,n} - c_{m-i,n-j} \qquad [1]$$

where $r_{m,n}$ and $c_{m,n}$ represent REF and CMP snapshots at point {m,n} and i and j represent the offset between REF and CMP snapshots.

The area of the interior surface 110 of enclosure 100 that is the subject of each snapshot is typically substantially less than the overall size (area) of the interior surface 110 of enclosure 100. As the display unit 10 moves, so does the imager 32 in relation to the interior surface 110 of enclosure 100. Thus, the scene viewed (imaged) by imager 32 also changes.

In order for cross-correlation calculations to be effectively carried out, it is important that details of the interior surface 110 of enclosure 100 contained in the REF snapshot have some commonality (area of commonality 45) with details of the interior surface 110 of enclosure 100 contained in the second CMP snapshot. In other words, the distance traveled by imager 32 between the point at which the REF snapshot is obtained and the point at which the CMP snapshot is obtained cannot be so great that the details contained in the CMP snapshot totally lack commonality with the REF snapshot. If this condition occurs, the display unit 10 will become "lost" or "out of bounds" within the environment. In order for tracking of the relative position of display unit 10 to function smoothly it is necessary for the CMP snapshot of the navigation surface to be obtained so as to include at least some portion of the navigation surface details that also appear in the first REF snapshot image.

As movement of the imager 32 progresses, the overlap (or area of commonality) between the CMP and REF snapshots decreases. In the extreme case, there would be no overlap (area of commonality) between the CMP and REF images, as is exemplified in FIG. 6 by REF snapshot 41 and snapshot 48. In this case, the imager 32 would become "lost" and be unable to properly report the relative position of display unit 10. However, in the present invention as the area of commonality between the CMP snapshot and the REF snapshot decreases to a predetermined area, or percentage, of commonality (overlap), the CMP snapshot is copied into storage memory 75 to thus become the new REF snapshot. This procedure is called a re-referencing procedure or REREF. Immediately, subsequent to a REREF, the CMP snapshot and REF snapshot are the same, meaning that there is complete or total overlap (commonality) for cross-correlation purposes.

An alternative to the above procedure involves obtaining a cumulative snapshot of the entire interior surface 110 of enclosure 100 via taking a series of snapshots of the interior surface 110 of enclosure 100 and storing the data into memory 75. This stored data cumulatively represents the entire interior surface 110 (cumulative snapshot), or a selected portion thereof. Subsequently, as display unit 10 is moved during use, comparison snapshots (CMP) are taken of the interior surface 100 and compared with the cumulative snapshot data stored in memory 75. This alternative does require increased hardware, specifically memory to accommodate the increased snapshot data size. However, it eliminates the possibility that cross-correlation calculations cannot be carried out where the CMP snapshot shares no commonality of details with the REF snapshot (where the display unit 10 gets lost), since all details of the interior surface 110 of enclosure 100 are stored in memory 75. Interior surface 110 of enclosure 100 preferably has a cooperative texture, or pattern, along all surface areas that will be monitored by imager 32 of optical correlator 30. It should be noted, however, that the surface texture of interior surface 110 of enclosure 100 could also be of a random nature.

Figure 6:
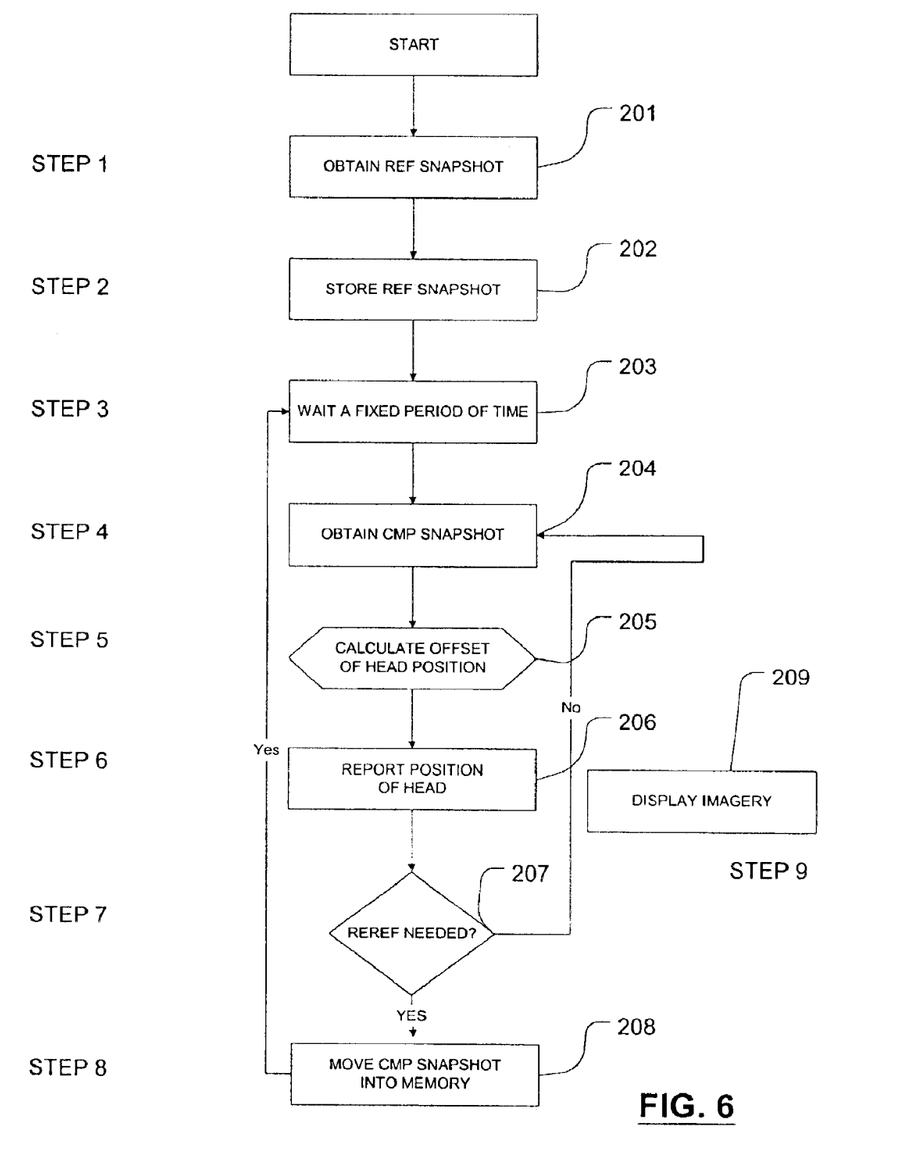
FIG. 6 is a flow chart illustrating the method of the present invention.

FIG. 6 is a flow chart illustrating the method of the present invention. A reference snapshot (REF) of interior surface 110 of enclosure 100 is obtained via imager 32 (201). The reference snapshot (REF) is stored into memory 75 (202). After a fixed period of time has elapsed (203), a comparison snapshot (CMP) of interior surface 110 of enclosure 100 is obtained via imager 32 (204). Navigation engine 70 calculates the relative position and angle of the display unit 10 via cross correlating reference snapshot (REF) with comparison snapshot (CMP) (205). The position and angle of display unit 10 is then reported to the controller 71 in accordance with the calculations of the step at 205 (206). A determination is made as to whether or not the display unit 10 has moved more than a predetermined distance (or to a point where CMP and REF snapshots share less than a predetermined area of commonality) since the reference snapshot (REF) was obtained (207). If it is determined in the step at 207 that the display unit 10 has moved more than a predetermined distance ("out of bounds"), the comparison snapshot (CMP) obtained in the step at 206 is stored to memory 75 and becomes the new REF snapshot (208).

Further, the present invention provides an immersive display system which can be used to augment existing accelerometer based immersive display systems so as to more accurately establish up/down with respect to gravity and to distinguish between head motion and the motion of objects/structures in the area surrounding the user.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiment(s) of the invention without departing substantially from the principles of the invention. All such modifications and variations are intended to be included herein within the scope of the present invention and protected by the following claims.

What is claimed:

1. A display system for displaying imagery to a user comprising:

a display unit comprising headgear, an optical correlator and a visual display, the headgear being sized and shaped to be placed upon the head of a user, the optical correlator comprising an imager operative to capture image data corresponding to a surface, the optical correlator being mounted to the headgear and being operative to monitor a surface optically and to generate an image output signal corresponding to the surface, the visual display being mounted to the headgear such that the visual display can be viewed by the user when the headgear is placed upon the head of the user, the visual display being operative to display imagery based upon the image output signal from said optical correlator; and an enclosure sized and shaped to at least partially surround said display unit;

wherein the surface to be monitored by the optical correlator is an interior surface of said enclosure.

2. A display system according to claim 1, wherein the optical correlator is a first optical correlator; and further comprising a second optical correlator mounted to the headgear and being operative to monitor a surface optically and to generate a second image output signal corresponding to the surface.

3. A display system according to claim 2, wherein the first optical correlator and the second optical correlator are positioned to monitor different portions of the surface.

4. A display system according to claim 1, wherein said optical correlator further comprises an optical system operative to focus light onto said imager.

5. A display device according to claim 1, wherein the imager comprises a complementary metal-oxide semiconductor (CMOS) photo imager.

6. A display system according to claim 1, further comprising an image generator operative to generate an output signal, the output signal being used by said visual display to display imagery.

7. A display system according to claim 6, further comprising means for transmitting signals to said display unit from said image generator.

8. A display system according to claim 6, further comprising:

a navigation engine operative to receive the image output signal from said optical correlator, to determine a relative position of said optical correlator with respect to the surface, and to provide a positional signal to said image generator for use in generating the output signal.

9. A visual display according to claim 8, wherein said image generator and said navigation engine are mounted to said headgear.

10. A display device according to claim 8, further comprising a wireless interface; and wherein said image generator communicates with said visual display via said wireless interface.

11. A display device according to claim 10, wherein said wireless interface comprises an infrared transmitter.

12. The display system of claim 1, wherein the imager comprises a photodiode array.

13. The display system of claim 1, wherein the imager comprises a phototransistor array.

14. The display system of claim 1, wherein the imager comprises a charge-coupled device.

* * * * *

UNITED STATES PATENT AND TRADEMARK OFFICE
CERTIFICATE OF CORRECTION

PATENT NO. : 6,870,520 B2 Page 1 of 1
APPLICATION NO. : 10/341624
DATED : March 22, 2005
INVENTOR(S) : Richard C. Walker et al.

It is certified that error appears in the above-identified patent and that said Letters Patent is hereby corrected as shown below:

On the Title page, in Item (76), in "Inventors", in column 1, line 4, delete "Sunnyvale, CA" and insert -- Mountain View, CA --, therefor.

In column 3, line 36, delete "bead" and insert -- head --, therefor.

In column 5, line 36, after "surface" delete "100" and insert -- 110 --, therefor.

Signed and Sealed this

Ninth Day of February, 2010

David J. Kappos
*Director of the United States Patent and Trademark Office*